March 24, 1964     M. R. FIELDS     3,125,801
METHOD AND APPARATUS FOR MAKING A THREADED PLASTIC MOLD CAP
Filed May 1, 1961     2 Sheets-Sheet 1
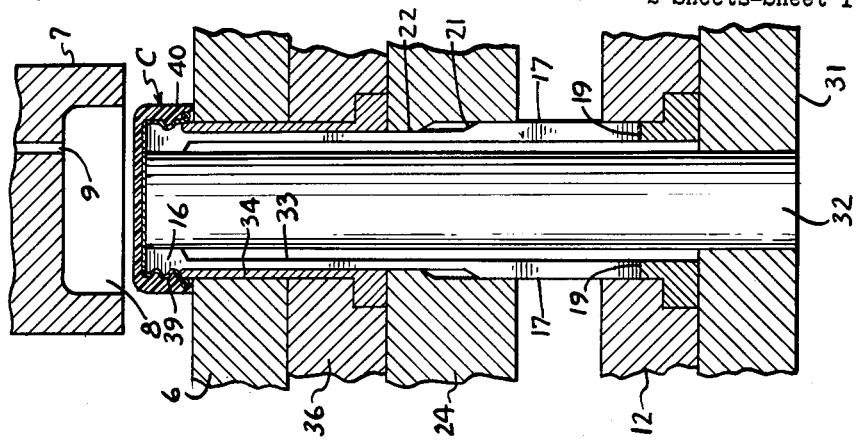
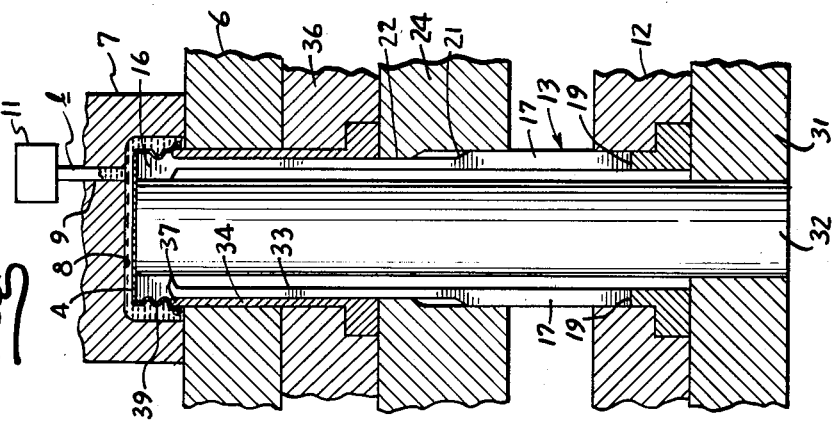
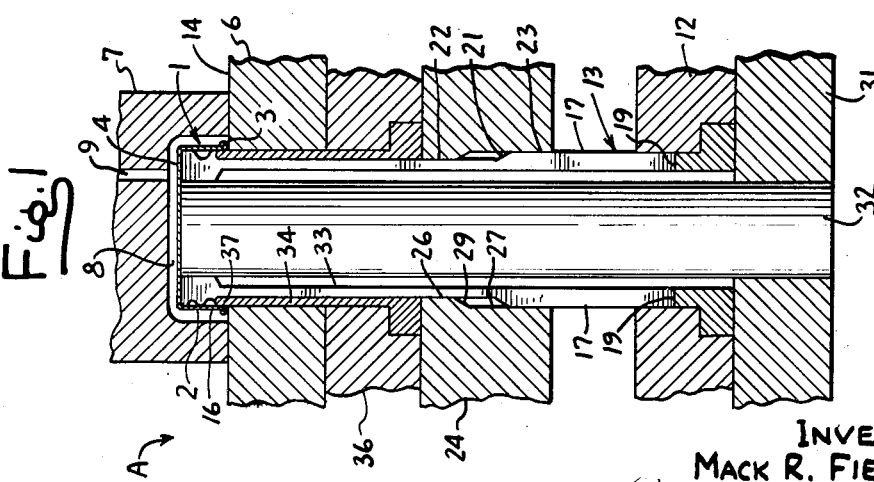
INVENTOR
MACK R. FIELDS
by: *Morris Spector*
ATTY.

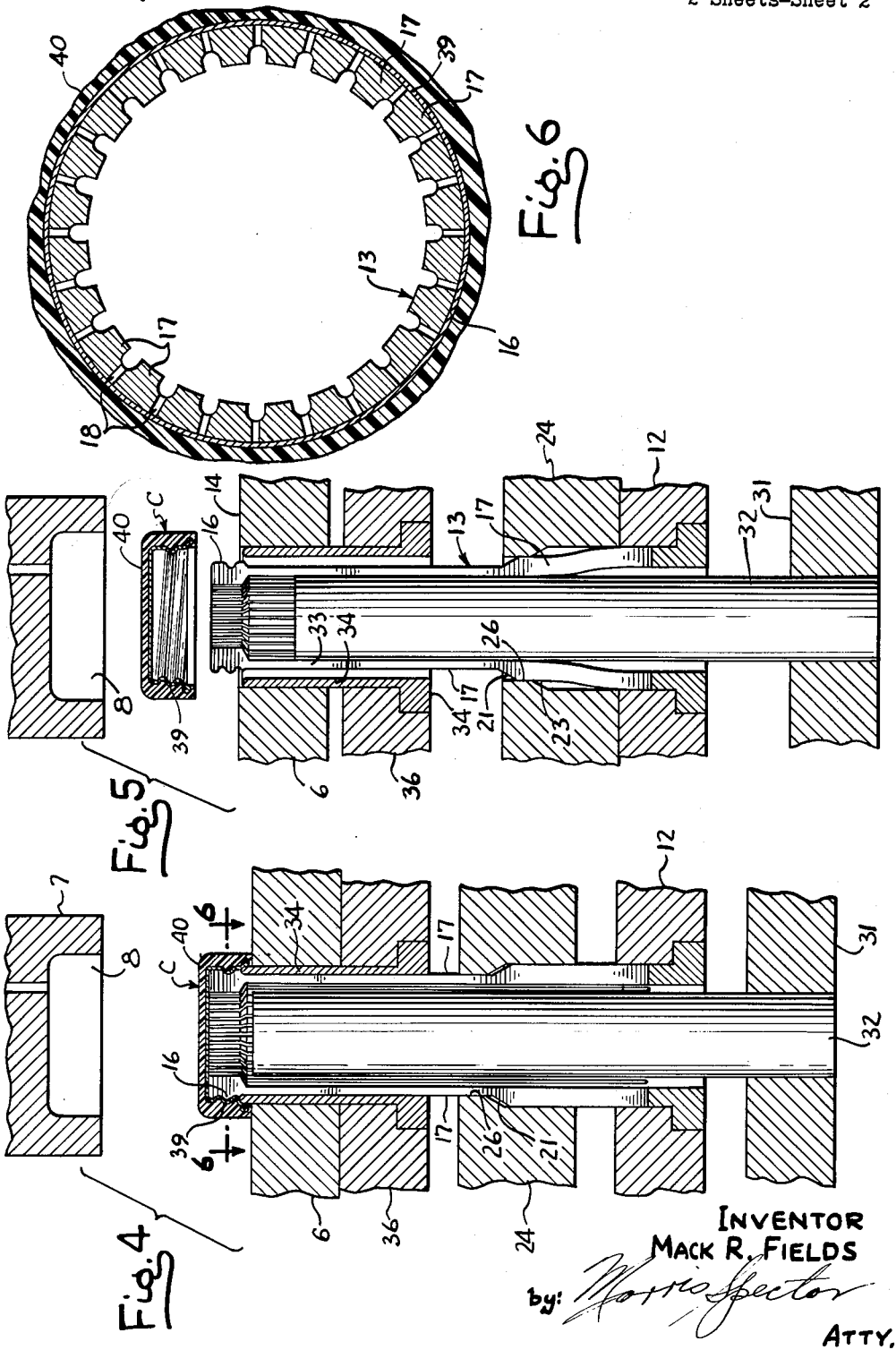

3,125,801
METHOD AND APPARATUS FOR MAKING A THREADED PLASTIC MOLD CAP
Mack R. Fields, Chicago, Ill.
(321 Ames St., Libertyville, Ill.)
Filed May 1, 1961, Ser. No. 106,790
9 Claims. (Cl. 29—421)

This invention relates to the making of the threads on container caps, and more particularly, to a method and apparatus of making threaded plastic coated metal caps.

It is an object of the present invention to provide a method and apparatus for making a plastic coated sheet metal cap in which the plastic coating is molded over the outside of a metal shell and a thread is formed on the shell during the molding operation.

It is a further and more specific object of the present invention to provide a method and apparatus of the type stated in which a plastic coating is molded over an unthreaded metal shell or cap blank which is telescoped over a split die and wherein threads are formed in the metal shell during the molding operation and then the die is radially contracted so that the threaded cap may be stripped from the mold without having to unscrew the cap from the die.

The attainment of the above and further objects of the present invention will be apparent from the following specification taken in conjunction with the accompanying drawing forming a part thereof.

In the drawing:

FIG. 1 is a fragmentary longitudinally sectional view of apparatus constructed in accordance with and embodying the present invention and showing a step in the method of the present invention;

FIGS. 2, 3, 4 and 5 are longitudinal fragmentary sectional views of the apparatus of FIG. 1 and showing additional steps in the method of the present invention; and FIG. 6 is a fragmentary sectional view on an enlarged scale taken along lines 6—6 of FIG. 4.

Referring now in more detail and by reference numerals to the drawing, which illustrates a preferred embodiment of the present invention, A designates apparatus for threading a sheet metal shell 1, and for molding an outer coating of plastic thereover. The shell 1 may be drawn from any suitable sheet metal, such as light gauge aluminum or tin plate and may, for example, have a wall thickness of approximately .008 to .012 inch. The shell 1 includes an unthreaded cylindrical skirt 2 which terminates at the open end of the shell 1 in an upwardly curled rim 3. At the other end of the skirt 2 is an end wall 4.

The apparatus A comprises a mold member 6 which cooperates with a mold member 7 having a mold cavity 8 therein. The mold member 7 has a gate 9 which is in communication with a suitable injection molding apparatus 11 from which hot liquid plastic $l$ under high pressure may be introduced into the mold cavity 8, and for purposes presently more fully appearing. The injection molding apparatus 11 is conventional and is, therefore, diagrammatically represented rather than described in detail herein.

Rigidly mounted at one end on a plate 12 and extending upwardly therefrom is a tubular core-collet or die 13 which projects through the mold member 6, terminating outwardly of the face 14 thereof in a helically threaded end 16. The die 13 is longitudinally divided into a plurality of circumferential sections 17 having longitudinally extending radial slots or spaces 18 therebetween. These slots 18 extend upwardly from bases 19, which are just above the bottom or secured end of the die 13, throughout the remainder of the die 13. When the die sections are in the positions shown in FIGS. 1–4, the helical thread 16 may be the same as the standard glass bottle-neck thread having a diameter and length corresponding to the length and diameter of the thread 16. Somewhat centrally of the length thereof, the sections 17 have shoulders 21 which join the smaller diameter upper portions 22 to the diametrally enlarged lower portions 23. Mounted for reciprocating movement along the die 13 is a cam plate 24 having coaxial bores 26, 27 for slidably receiving the portions 22, 23 respectively, the bores being joined by a conical shoulder 29.

Rigidly mounted on a shiftable support 31 is a center pin 32 which extends coaxially through the die 13 and ends flush with the threaded end 16. The bore 33 of the die 13 is diametrally reduced at the threaded end 16 so that when the center pin 32 is positioned therein a support for the sections 17 will be provided at the threaded end 16.

An annular sealing ring 34 is mounted on a plate 36 therefor, and the sealing ring 34 projects upwardly through the mold member 6. The upper end 37 of the sealing ring 36 lies above the face 14 and fits against the lower end of the thread 16.

In use, the mold member 7 is separated from the mold member 6 whereupon the shell 1 is telescoped over the threaded end 16 until the end wall 4 abuts the upper end of the threaded end 16 and center pin 32. The internal diameter of the cylindrical skirt 2 is slightly greater than the maximum outside diameter of the thread 16, and the length of the thread 16 is preferably less than the overall length of the shell skirt 2. The upper end 37 of the sealing ring 34 telescopes a short distance within the shell skirt 2 and is in tight-fitting relationship therewith.

The mold member 7 is then shifted downwardly to the position shown in FIG. 1 so that the mold member 7 contacts the mold member 6. As shown in FIG. 2, liquid plastic $l$ from the apparatus 11 is injected under high pressure through the gate 9 into the mold cavity 8 whereupon the hot plastic will flow between the mold cavity wall and the shell 1. The pressure of the plastic will be applied uniformly around the shell skirt 2 and will be of sufficient magnitude to deform the metal of the shell skirt 2 beyond its elastic limit and force the metal into the thread 16 and form a thread 39 on the shell skirt 2. The center pin 32 retains the die sections 17 against collapse during the molding operation. As the thread 23 is formed, the liquid plastic $l$ will cover not only the exterior surface of the threaded skirt but will also be forced into the small space between the rim 3 and mold face 14. Therefore, the bottom or rim of the completed cap C will be covered with the plastic 40. The sealing ring 34 prevents the liquid plastic from flowing to the inside of the shell 1.

During the thread-forming operation the metal of the shell skirt 2 may or may not be deformed into the slots or spaces 18 between the die sections 17 depending on the spacing of the slots 18 in relation to the thickness and ductility of the metal of the skirt of the shell 2, so that the interior of the thread 39 on the finished cap skirt will be smooth in one case or formed with a plurality of circumferentially spaced, radially inwardly extending projections. These projections assist in providing a firm grip of the cap thread with the thread of the container upon which the cap is used. By controlling the width of the slots 18, the depth of such projections may be controlled. However, the width of the slots should be no greater than twice the thickness of the metal of the shell skirt. If the slots 18 are no wider than the thickness of the metal of the shell skirt the thread formed on the skirt will be smooth.

When the plastic has solidified, as shown in FIG. 3, the mold member 7 is raised to retract it from the mold member 6 preparatory to ejecting the completed cap C with the solidified plastic coating 40. Then, as shown in FIGS. 4 and 5, the support 31 is then shifted downwardly to move the center pin 32 axially downwardly below the threaded end 16, and the cam plate 24 is shifted downwardly until the wall of the bore 26 rides over the shoulders 21 and onto the diametrally enlarged lower portions 23 of the sections 17. This readily contracts or collapses the die sections 17 onto the center pin 32 and thereby contracts the thread 16 an amount sufficient to clear the thread 39 formed on the shell skirt. Thereafter, the mold member 6 shifts upwardly until its face 14 is upwardly of the end 37 of the sealing ring 36, thereby stripping the completed cap C from the sealing ring 34. The cam plate 24, center pin support 31, and mold member 6 may then be returned to the positions shown in FIG. 1 to repeat the molding and thread-forming operations.

The amount of contraction the die 13 is capable of undergoing will depend upon the number of slots 18 and the widths thereof. In the design of the die, a sufficient number of slots of suitable width must be provided so that the threaded end 16 is capable of being collapsed or contracted an amount sufficient to clear the thread 39. Furthermore, when the cam plate 24 shifts to the position shown in FIG. 5, the lower portions of the die therein will be flexed to the positions shown in FIG. 5. Therefore, the metal out of which the die is made must be one capable of undergoing the required amount of flexing within its elastic limits during the collapse of the die sections 17.

In accordance with the present invention, the cam plate 24 may be eliminated and the die 13 may be constructed so that normally it is in the collapsed or contracted position. When the shell 1 is telescoped over the threaded end 16, the center pin 32 may be inserted into the threaded end 16 to spread apart and support the die sections 17 during the thread-forming and molding operations. Then when the center pin 32 is retracted from the threaded end 16 after completion of the threading and molding, the resiliency of the metal of the die will cause the sections 17 to collapse to their normal positions and clear the thread 39, whereupon the cap C may then be axially retracted from the die.

The completed cap C may be readily threaded onto the neck of a bottle or other container in which the neck has a thread which is the same as that of the spiral thread 16. Furthermore, the solidified plastic coating 40 is quite thin since it need only be sufficient to cover the metal and for this reason the present invention, is, furthermore, capable of rapidly producing the caps C because the contraction of the die 13 permits the completed cap C to be removed from the die without the necessity of having to unscrew the cap C from the thread 16.

In the present invention various types of plastic may be used. Polyethylene and polystyrene are both suitable.

In compliance with the requirements of the patent statutes a preferred embodiment of the invention has been shown and described. It is, however, to be understood that the invention is not limited to the method or apparatus shown, the same being merely illustrative of the principle of the invention. What is considered new and desired to be secured by Letters Patent is:

1. A method of internally threading and plastic coating a hollow metal cap blank having an annular skirt, said method comprising telescoping the skirt over a radially contractable threaded die having a plurality of circumferentially spaced threaded sections that form a thread that is interrupted between adjacent sections, applying plastic under sufficient pressure to the exterior of the skirt to deform the skirt and force it into the die thread and form a thread on the skirt, and prior to relative axial separation of any of said spaced die sections and skirt, radially contracting the die all of said spaced threaded sections of an amount sufficient so that the contracted die clears the thread formed on the skirt to enable one of said skirt and die to be retracted from the other by axial movement of the one relative to the other, the wall thickness and ductility of the skirt in relation to the spacing of the threaded die sections being such that a substantially continuous thread is formed on said cap.

2. Apparatus for internally threading and plastic coating a hollow cap blank, said apparatus comprising a die having a threaded part longitudinally divided into a plurality of circumferentially spaced sections and adapted to be telescoped within the blank, the thread being interrupted between adjacent sections, mold means having a mold cavity for receiving the blank and part of the die telescoped therein, means for introducing plastic into the mold cavity under sufficient pressure to force the material of the blank into the die thread and plastic coat the blank and form a thread on the blank, and actuating means operatively connected to the die sections for radially contracting the die sections an amount sufficient to clear the thread formed on the blank, the circumferential spacing of the sections being no greater than the wall thickness of the material of the part of the blank telescoped therewith.

3. Apparatus for plastic coating and threading an unthreaded cap blank, said apparatus comprising a die having a threaded part longitudinally divided into a plurality of sections and adapted to be telescoped within the blank, said sections in their operative position being circumferentially spaced from each other an amount no greater than the thickness of the material of the blank, the thread being interrupted between adjacent sections, said sections being radially movable from their operative position to a radially contracted retracting position, mold means having a mold cavity for receiving the blank and part of the die telescoped therein, the mold cavity being of such size as to provide a plastic-receiving space between the cavity wall and the cap blank, means for placing the mold cavity space between the cap blank and cavity wall under sufficient pressure to force the material of the blank into the die thread and form a thread on the blank, and actuating means operatively connected to said die sections for radially moving the die sections from one of said positions to its alternate position.

4. Apparatus according to claim 3 wherein a pin extends axially within the die for supporting the die sections.

5. Apparatus according to claim 4 wherein the mold means includes separable mold parts and the die projects through one of said mold parts.

6. A method of making a plastic coated threaded cap, said method comprising telescoping a hollow cap blank having an annular skirt over a radially contractable threaded die with the annular skirt surrounding the thread on said die and with the threaded part of the die being comprised of circumferentially spaced sections so that the thread is interrupted between adjacent sections, enclosing the blank and die while so telescoped within a mold, thereafter introducing plastic into the mold and applying sufficient pressure through the plastic to the exterior of the skirt to deform the material of the skirt and force said material into the thread to form a thread on said skirt, allowing the plastic to solidify over the skirt, and prior to relative axial separation of any of said spaced die sections and skirt, radially contracting said spaced die sections to enable the plastic coated cap to be separated from the die by axially shifting of one without rotation of either, the characteristics of the blank material in relation to the spacing of the die sections being such that a substantially continuous thread is formed on said cap.

7. Apparatus for forming an internal radial deformation and plastic coating a hollow shell, said apparatus comprising a die having part thereof longitudinally divided into a plurality of circumferentially spaced sections and adapted to be telescoped with the hollow shell, said part having a radial deformation that extends around the longitudinal axis of the die but is interrupted at the spaces between adjacent sections, means for subjecting the shell to plastic under sufficient pressure to force the material of the shell into the die and form a radial deformation on the shell that is a counterpart of the deformation on the die and at the same time plastic coat the shell, said sections having a radially expanded position and a radially contracted position, one of the positions being its deformation-forming position and the other being its retracting position wherein the deformation on the die sufficiently clears the deformation on the shell so that the shell and die may be separated by axial retraction of one without rotation of either, and actuating means operatively connected to each of the die sections for moving the die sections radially from one of its said positions to the other position, the characteristics of the shell in relation to the spacing of the die sections being such that a substantially continuous counterpart deformation is formed on the shell.

8. A method of making a plastic coated article having a cavity, said method comprising providing a radially contractable die that has a plurality of circumferentially spaced sections that provide a radial deformation that extends around the longitudinal axis of said die and is interrupted at the spaces between the adjacent sections, telescoping over the die sections a hollow member, thereafter applying plastic under sufficient pressure to the exterior of the member to deform the member and force it into said radial deformation to form on said member substantially a counterpart radial deformation and at the same time coat the member with the plastic, the characteristics of the material of the member in relation to the spacing of the die sections being such that said counterpart deformation is substantially continuous from one section to the next adjacent section, and prior to relative axial separation of any of said spaced die sections and member, radially contracting the die an amount sufficient for the die deformation to clear said counterpart deformation to enable the member to be separated from the die by axially shifting of one without rotation of either.

9. A method of making a plastic coated metal article having a cavity, said method comprising providing a radially contractable die that has a plurality of circumferentially spaced sections that provide a radial deformation that extends around the longitudinal axis of said die and is interrupted at the spaces between the adjacent sections, telescoping over the die a hollow metal member, thereafter applying plastic under sufficient pressure to the exterior of the member to deform the member and force it into said radial deformation to form on said member substantially a counterpart radial deformation and at the same time coat the member with the plastic, the wall thickness and ductility of the metal in relation to the spacing of the sections being such that said counterpart deformation is substantially continuous from one section to the next adjacent section, and prior to relative axial separation of any of said spaced die sections and member, radially contracting the die an amount sufficient for the die deformation to clear said counterpart deformation to enable the member to be separated from the die by axially shifting of one without rotation of either.

References Cited in the file of this patent

UNITED STATES PATENTS

| | | |
|---|---|---|
| 2,033,643 | Neill | Mar. 10, 1936 |
| 2,845,658 | Knibb | Aug. 5, 1958 |
| 2,970,343 | Johnson et al. | Feb. 7, 1961 |